(12) United States Patent
Asher et al.

(10) Patent No.: US 6,724,343 B2
(45) Date of Patent: Apr. 20, 2004

(54) WEAK SIGNAL AND ANTI-JAMMING GLOBAL POSITIONING SYSTEM RECEIVER AND METHOD USING FULL CORRELATION GRID

(75) Inventors: Mark S. Asher, Ellicott City, MD (US); Lloyd A. Linstrom, Columbia, MD (US); Robert L. Henderson, Ellicott City, MD (US); Dennis J. Duven, Silver Spring, MD (US)

(73) Assignee: The Johns Hopkins University, Baltimore, MD (US)

(*) Notice: Subject to any disclaimer, the term of this patent is extended or adjusted under 35 U.S.C. 154(b) by 0 days.

(21) Appl. No.: 10/422,544

(22) Filed: Apr. 24, 2003

(65) Prior Publication Data

US 2003/0201934 A1 Oct. 30, 2003

Related U.S. Application Data

(60) Provisional application No. 60/376,684, filed on Apr. 30, 2002.

(51) Int. Cl.[7] .............................. B01S 5/14; H04B 1/69; H04B 1/707
(52) U.S. Cl. .................................. 342/357.12; 375/150
(58) Field of Search ........................ 342/357.12; 375/150

(56) References Cited

U.S. PATENT DOCUMENTS

| | | | |
|---|---|---|---|
| 4,578,678 A | | 3/1986 | Hurd |
| 5,398,034 A | | 3/1995 | Spilker, Jr. |
| 5,644,591 A | * | 7/1997 | Sutton ........................ 375/142 |
| 5,983,160 A | | 11/1999 | Horslund et al. |
| 5,987,059 A | | 11/1999 | Harrison et al. |
| 6,459,407 B1 | * | 10/2002 | Akopian et al. ...... 342/357.12 |
| 6,532,251 B1 | * | 3/2003 | King et al. .................. 375/142 |
| 2002/0126044 A1 | * | 9/2002 | Gustafson et al. ..... 342/357.12 |

OTHER PUBLICATIONS

U.S. Pat. App. Pub. # US 2002/0084933, Jul. 4, 2002 By N. Krasner.
U.S. Pat. App. Pub. # US 2002/0005802, Jan. 17, 2002 By R. Bryant, et al.

* cited by examiner

Primary Examiner—Gregory C. Issing
(74) Attorney, Agent, or Firm—Albert J. Fasulo, II

(57) ABSTRACT

Disclosed is a system and method for increasing the weak signal recovery capability of a Global Positioning System (GPS) receiver correlating each of the plurality of digital signals by multiplying the I and Q phases by the carrier and code, adding a location offset, accumulating the results of the correlation, and latching the results until a predetermined time; coherent combining the accumulated results at the predetermined time; non-coherent combining the coherent combined results for a time period sufficient to raise a correlation peak to a predetermined point above a noise floor to produce a plurality of non-coherent bin observables; determining a maximum value of the plurality of bin observables and comparing the maximum value to predetermined threshold; determining grid locations of bin observables having maximum values greater than the predetermined threshold; determining a bi-quadratic surface using the grid locations; determining an argument maximum of the bi-quadratic surface; estimating epoch pseudorange and Doppler variables based on the argument maximum; estimating errors in at least one of position, velocity, orientation, user clock, frequency, and ionosphere states on the estimated epoch pseudorange and Doppler variables; and determining at least one of position, velocity and orientation by correcting for the estimated errors.

9 Claims, 2 Drawing Sheets

WEAK SIGNAL AND ANTI-JAMMING GLOBAL POSITIONING SYSTEM RECEIVER AND METHOD USING FULL CORRELATION GRID

CROSS-REFERENCE TO RELATED APPLICATIONS

This application claims the benefit of U.S. Provisional Application No. 60/376,684, filed Apr. 30, 2002, the contents of which are incorporated herein by reference.

STATEMENT OF GOVERNMENTAL INTEREST

This invention was made with Government support under Contract No. NAS5-01072 awarded by the National Aeronautics and Space Administration. The Government has certain rights in the invention.

BACKGROUND OF THE INVENTION

1. Field of the Invention

The present invention relates generally to a weak signal and anti-jamming Global Positioning System (GPS) receiver and method, and in particular, to a weak signal and anti-jamming Global Positioning System (GPS) receiver and method using full correlation grid detection and estimation.

2. Description of the Relation Art

Global Positioning Systems (GPS) are widely utilized in both commercial and military applications. Whether determining the location of a cellular telephone having a GPS tracking systems, navigating a commercial airliner or military jet, or guiding ordinance to particular targets, the reliance on GPS to provide accurate positioning is increasing.

Along with the increased reliance upon the GPS comes a growing need to provide more accurate and reliable GPS positioning. GPS signals can be adversely affected by various factors including, for example, low signal strength, noise and GPS jamming devices. Each of these causes the GPS system to provide false and inaccurate positioning data in the particular applications. In turn, this inaccurate or false data can cause devastating effects.

Many systems have been devised to counteract the adverse effects of the various factors. One such attempt is to increase the coherent integration time used to compute the input to frequency discriminators in a frequency locked loop. This method requires message bit prediction to work at high jamming levels (i.e. >42 dB). Operational constraints often make full message bit prediction impracticable.

One system that attempts to increase jamming immunity by optimizing processing gain for GPS/INS (Inertial Navigation System) systems is disclosed in U.S. Pat. No. 5,983, 160 issued to Horslund et al. on Nov. 9, 1999. The Horslund et al. system includes a signal processor for receiving and down-converting GPS signals to a baseband frequency to provide I and Q (sine and cosine) signals. An integrate and dump operation is performed on the I and Q signals to provide GPS range and range rate residuals which are uncorrelated from sample to sample. A Kalman filter estimates navigation state corrections from the GPS range and range rate residuals. A generic navigation (NAV) function, responsive to the output of the Kalman filter and range error and velocity error signals, provides guidance information and signals for correcting position, velocity, and IMU (Inertial Measurement Unit) alignment states which are dynamically calculated from the range and range rate measurements. A line of sight geometry function maps position and velocity vector information from the NAV function into geometric range and range rate scalar information and feeds the scalar information to the signal processor and circuitry to perform the integrate and dump operation. This system improves the performance of the frequency locked loop by increasing the coherent integration time prior to the nonlinear frequency discriminator.

SUMMARY OF THE INVENTION

It is, therefore, an aspect of the present invention to provide a weak signal and anti-jamming Global Positioning System (GPS) receiver and method, and in particular, a weak signal and anti-jamming Global Positioning System (GPS) receiver and method using full correlation grid detection and estimation.

In accordance with another aspect of the present invention, there is provided a weak signal and anti-jamming Global Positioning System (GPS) receiver and method, and in particular, a weak signal and anti-jamming Global Positioning System (GPS) receiver and method using full correlation grid detection and estimation for use in military and spaceborne applications that require inertial navigation computations and inertial measurements.

The foregoing aspects of the present invention are realized by a system for increasing the accuracy of a Global Positioning System (GPS) receiver having an antenna for receiving a plurality of GPS signals from a plurality of GPS satellites, a down converter for down-converting the plurality of received signals, and an analog-to-digital (A/D) converter for converting the plurality of down-converted signals to a plurality of digital signals, each signal having an I (in) and Q (quadrature) phase component, comprising a correlator array for correlating each of the plurality of digital signals by multiplying the I and Q phases by carrier and code plus a correlation-grid location offset, accumulating the results of the correlation, and latching the results until a predetermined time; a coherent combiner for coherent combining the accumulated results at the predetermined time; a non-coherent combiner for non-coherent combining the coherent combined results for a time period sufficient to raise a correlation peak to a predetermined level above a noise floor to produce a plurality of non-coherent bin observables; a correlation grid detector for determining a maximum value of the plurality of bin observables and comparing the maximum value to a predetermined threshold, determining grid locations of bin observables having maximum values greater than the predetermined threshold, determining a bi-quadratic surface using the grid locations, and determining an argument maximum of the bi-quadratic surface; a correlation grid estimator for estimating epoch pseudorange and Doppler variables based on the argument maximum; and a Kalman filter for estimating errors in position, velocity, orientation, user clock, frequency, and ionosphere states on the estimated epoch pseudorange and Doppler variables.

The system can further comprise an orbit propagator for determining position and velocity by correcting for the estimated errors, or an inertial navigation computation module and an inertial measurement unit for determining position, velocity and orientation by correcting for the estimated errors.

In addition, a method for increasing the accuracy of a Global Positioning System (GPS) receiver having an antenna for receiving a plurality of GPS signals from a plurality of GPS satellites, a down converter for down-converting the plurality of received signals, and an analogto-digital (A/D) converter for converting the plurality of down-converted signals to a plurality of digital signals, each signal having an I (in) and Q (quadrature) phase component, is also disclosed, comprising the steps of correlating each of the plurality of digital signals by multiplying the I and Q phases by a carrier wave and code, adding a location offset, accumulating the results of the correlation, and latching the results until a predetermined time; coherent combining the accumulated results at the predetermined time; non-coherent combining the coherent combined results for a time period sufficient to raise a correlation peak to a predetermined point above a noise floor to produce a plurality of non-coherent bin observables; determining a maximum value of the plurality of bin observables and comparing the maximum value to predetermined threshold; determining grid locations of bin observables having maximum values greater than the predetermined threshold; determining a bi-quadratic surface using the grid locations; determining an argument maximum of the bi-quadratic surface; estimating epoch pseudorange and Doppler variables based on the argument maximum; estimating errors in at least one of position, velocity, orientation, user clock, frequency, and ionosphere states on the estimated epoch pseudorange and Doppler variables; and determining at least one of position, velocity and orientation by correcting for the estimated errors.

BRIEF DESCRIPTION OF THE DRAWINGS

The above and other objects, features and advantages of the present invention will become more apparent from the following detailed description when taken in conjunction with the accompanying drawings in which.

DESCRIPTION OF THE PREFERRED EMBODIMENTS

A preferred embodiment of the present invention will be described herein below with reference to the accompanying drawings. In the following description, well-known functions or constructions are not described in detail since they would obscure the invention in unnecessary detail.

The invention consists of at least a combination of hardware and software modules that can be used to recover pseudorange and Doppler information from a GPS signal when the GPS signal is very weak, even when the GPS ephemeris is unavailable a-priori to provide for substantial message bit aiding. The ephemeris is a list of accurate positions or locations of a celestial object as a function of time used to calculate positioning. Two areas where this is the case are Earth orbiting satellites in highly elliptical or very large circular orbits where the GPS signal is so weak that normally message bits cannot be recovered. The other example is in military systems which operate in a highly jammed environment and must be used immediately after "waking up" and which have limited interface capability for transferring the GPS ephemeris near the time of use.

Figure 1:
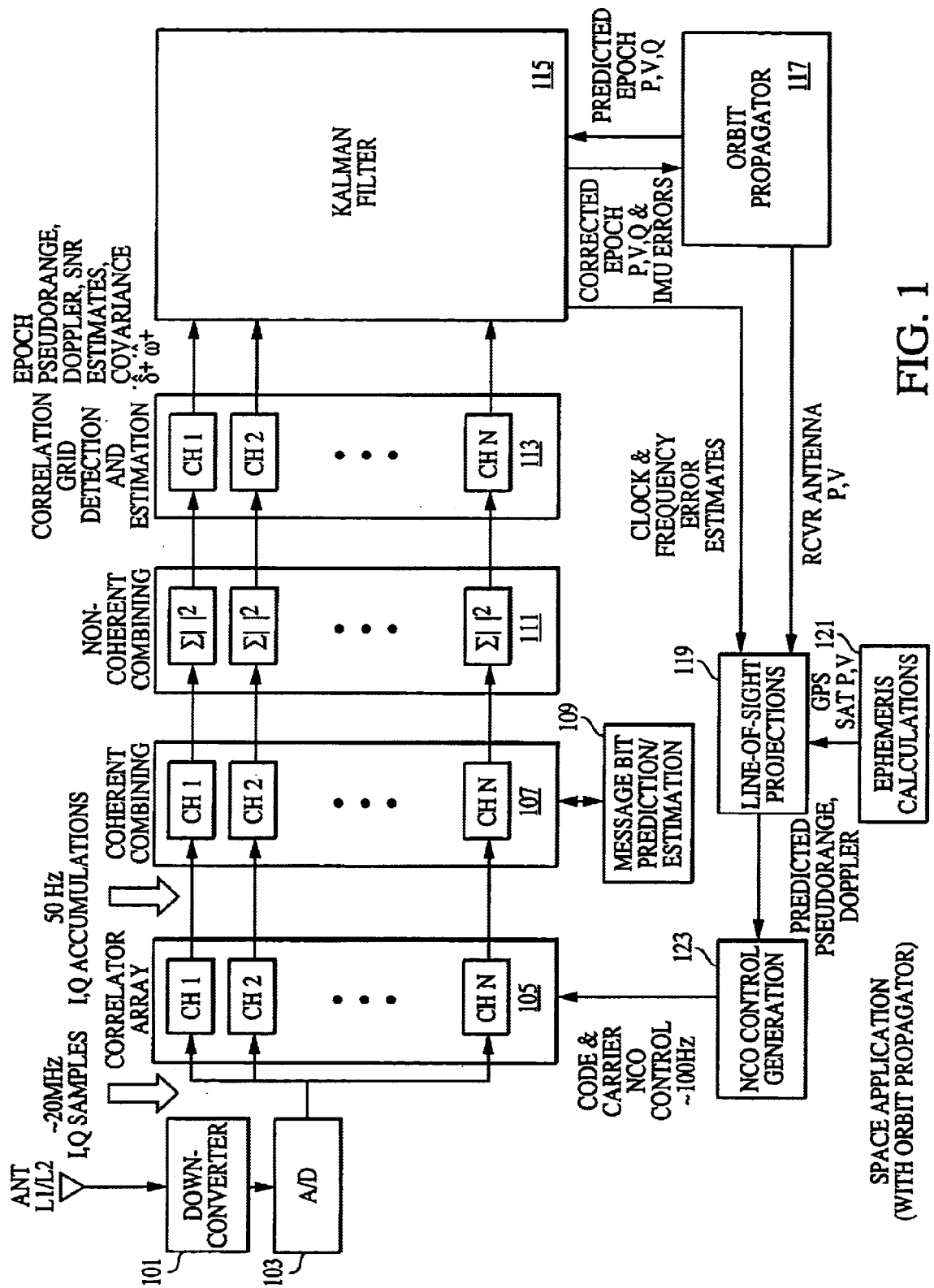
FIG. 1 is a block diagram of a GPS receiver according to an embodiment of the present invention; and, FIG. 2 is a diagram of a GPS receiver adapted for military use according to an embodiment of the present invention.

FIG. 1 is a block diagram of a GPS receiver according to an embodiment of the present invention. Shown in FIG. 1 is antenna ANT for receiving GPS positioning signals from orbiting satellites. The received signals are supplied to a down-converter 101 for down converting the received signal. The down converter 101 is shown connected to an analog-to-digital (A/D) converter 103 for converting the down converted signals into digital GPS data for processing. Correlator array 105 is connected to the outputs of the A/D converter 103. The correlator array 105 is shown implemented in hardware and is comprised of N channels CH 1-CH N, one for each GPS satellite from which signals are to be received. Each channel CH 1-CH N extends into the epoch range (i.e. measurement interval) and Doppler dimensions, and is centered on the estimate of the epoch range and Doppler dimensions determined by the line of sight projections of a state of a Kalman filter 115. The correlator array 105, at each node in the array grid, multiplies the in phase and quadrature phase (I phase and Q phase, respectively) digitized GPS data by local replicas of the carrier wave and modulation code to extract the original I and Q signals, based on the hypothesized epoch code phase and Doppler from the line of sight projections (discussed below).

Generally, GPS systems utilize a CDMA (Code Division Multiple Access) code, which is a method of frequency reuse whereby many signals use the same frequency but each one has a unique code. The GPS systems use CDMA pseudo-random noise codes for their unique cross-correlation properties. In its present state, the GPS transmission contains a coarse acquisition (CA, or civilian) code as well as an encrypted military code (the P (Y) code). The techniques herein disclosed applies to either code.

Returning again to FIG. 1, each correlator in the array 105 accumulates the products in an accumulator (not shown). At specific times the accumulations are latched and furnished to further components. The accumulator is then reset. The extent of the array grid in the Doppler and range dimensions are application specific and reflect the uncertainty in the state of the Kalman filter 115 projected onto the signal in question. Note that the correlator array 105 preferably contains code generators (not shown) that can be precisely triggered to start at an epoch implied by the predicted epoch pseudorange computed by the line of sight projections. The correlator array 105 also contains a numerically controlled oscillator (NCO) that generates a local carrier model based on the NCO control generator 123.

Next shown in FIG. 1 is coherent combining module 107 connected to the outputs of the correlator array 105. In the preferred embodiment of the present invention, the coherent combining module 107, realized in the preferred embodiment using software processes, one for each channel CH 1-CH N, accept the I and Q phase accumulations from the correlator array 105 and perform coherent combining by adding the I and Q phase accumulations after applying appropriate sign reversals to accomplish GPS message bit wipe-off. If the uncertainty in the estimations of the clock frequency or velocity of the Kalman filter 115 is large so that many Doppler bits must be searched, the Doppler dimension of the coherent combining module 107 can be realized using fast Fourier transforms (FFT's). The FFT's can produce complex numbers representing the I and Q components of the accumulations corresponding to a hypothesized epoch code and Doppler offset. Note that even when the message bits relating to the ephemeris are unknown, that portion of the handover word containing the time of week information (e.g., 30 bits or 0.6 seconds) is predictable provided time is known to a fairly coarse (i.e. millisecond) level. The handover word is a word in the GPS message that contains synchronization information for the transfer of tracking from the C/A to the P (Y) code of the GPS signal. A message bit prediction and estimation module 109 controls the message bit prediction. In this case the majority of the range and Doppler information will come from coherent integration within the handover word.

The output data from the coherent combining module 107 are fed into a non-coherent combining module 111. The non-coherent combining module 111, realized in the preferred embodiment using software processes, accepts on a channel by channel basis the I and Q coherent accumulations from the coherent combining module 107, squares and sums them, and then adds the summation to prior accumulations to accomplish non-coherent summing. This non-coherent combining continues for a time interval sufficient to raise a correlation peak above a noise floor. At each point in the pseudorange and Doppler space, the result of the non-coherent combining is referred to as a non-coherent bin observable. The output of the non-coherent combining module 111 will be a set of non-coherent bin observables corresponding to each grid location in pseudorange and Doppler space. Note that coherent observables with differing coherent integration times can be combined in this step by appropriate normalization. Variable coherent integration times may result from transitions from predictable sections of the message (i.e. the handover word) to unpredictable sections. Longer coherent integration data will obviously carry more information on the epoch pseudorange and Doppler, so to minimize processing one option is to ignore the shorter coherent integration time data from the coherent combining module 107.

The data output from the non-coherent combining module 111 is fed into a correlation grid detection and estimation module 113. The correlation grid detection and estimation module 113, realized in the preferred embodiment using software processes, one for each channel CH 1-CH N, determines a maximum value of the non-coherent bin observable calculated in the non-coherent combining module 111 and compares the maximum value to a threshold. If the maximum value is greater than the threshold, the correlation grid detection and estimation module 113 determines that a signal is actually present. The grid location in the range-Doppler grid, giving rise to this maximum value, is then determined. If a signal is present, the correlation grid detection and estimation module 113 fits a bi-quadratic surface (in pseudorange and Doppler variables) to the non-coherent bin observables using the grid points surrounding the grid point that gave rise to the maximum non-coherent bin observable. The argument maximum of this surface is the estimate of grid-relative pseudorange and Doppler variables. Note that this maximization process yields an estimate of epoch pseudorange and Doppler variables with higher resolution than the grid spacing. The pseudorange and Doppler measurements thus defined are relative to the epoch pseudorange and Doppler variables derived from the Kalman filter 115 which defined the grid center. The results from the correlation grid detection and estimation module 113 are furnished to the Kalman filter 115 as residuals between the measured pseudorange and Doppler variables and the predicted values.

The Kalman filter 115 estimates errors in position (P), velocity (V), and orientation (theta) (used in applications involving an inertial measurement unit (IMU)), as well as user clock (T), frequency (F) and ionosphere states on the basis of residual pseudorange and Doppler data from the correlation grid detection and estimation module 113. The Kalman filter 115 contains as states estimates of the errors in P and V at the current time corresponding to the reference epoch for the pseudorange and Doppler data, as well as a fixed point smoother (not shown). The residual pseudorange and Doppler measurements are directly sensitive to the fixed-point smoother states. After each measurement of the Kalman filter 115 is processed the updated estimates of the current P and V (and theta, i.e. orientation for the IMU) are use to update the initial conditions in an orbit propagator 117 or an inertial navigation computations module 217 (shown in FIG. 2 and explained in more detail below).

Typically in space applications, the orbit propagator 117, realized in the preferred embodiment using software processes, integrates the equations of orbital motion (including estimates of all known forces), starting from specific initial conditions into a trajectory defined in terms of position and velocity (or variables which can be converted into position and velocity). The orbit propagator 117 provides the Kalman filter 115 with predicted epochs, P, and V values, and receives corrected epoch P, and V from the Kalman filter 115. The output of the orbit propagator 117 is supplied to a line-of-sight projection module 119.

The line-of-sight projections module 119 modules, realized in the preferred embodiment using software processes, uses intermediate (i.e. measurements between epochs) position and velocity results from the orbit propagator 117, along with estimates of clock, frequency, frequency rate error, and ionosphere states from the Kalman filter 115, and in conjunction with GPS ephemeris from ephemeris calculations module 121, to calculate the evolution of the carrier and code phase within the total (i.e. coherent and non-coherent) integration period. Initial predicted pseudorange and pseudorange rates define the epoch pseudorange and Doppler variables at the grid center. The deviation of the profile from a linear extrapolation is used to drive the numerically controlled oscillators (NCOs) that form the local models for the code and carrier. This nonlinear part of the predicted pseudorange compensates for platform accelerations and the predictable parts of the user clock and the ionosphere. The same nonlinear compensation is applied to all nodes in the correlator array.

The NCO control generation module 123, realized in the preferred embodiment by software processes, optimally calculates fixed point code and carrier NCO control words from the floating point nonlinear pseudorange profile from the line-of-sight projections module 119 so as to minimize the code and carrier phrase errors developed over the total integration time.

Figure 2:
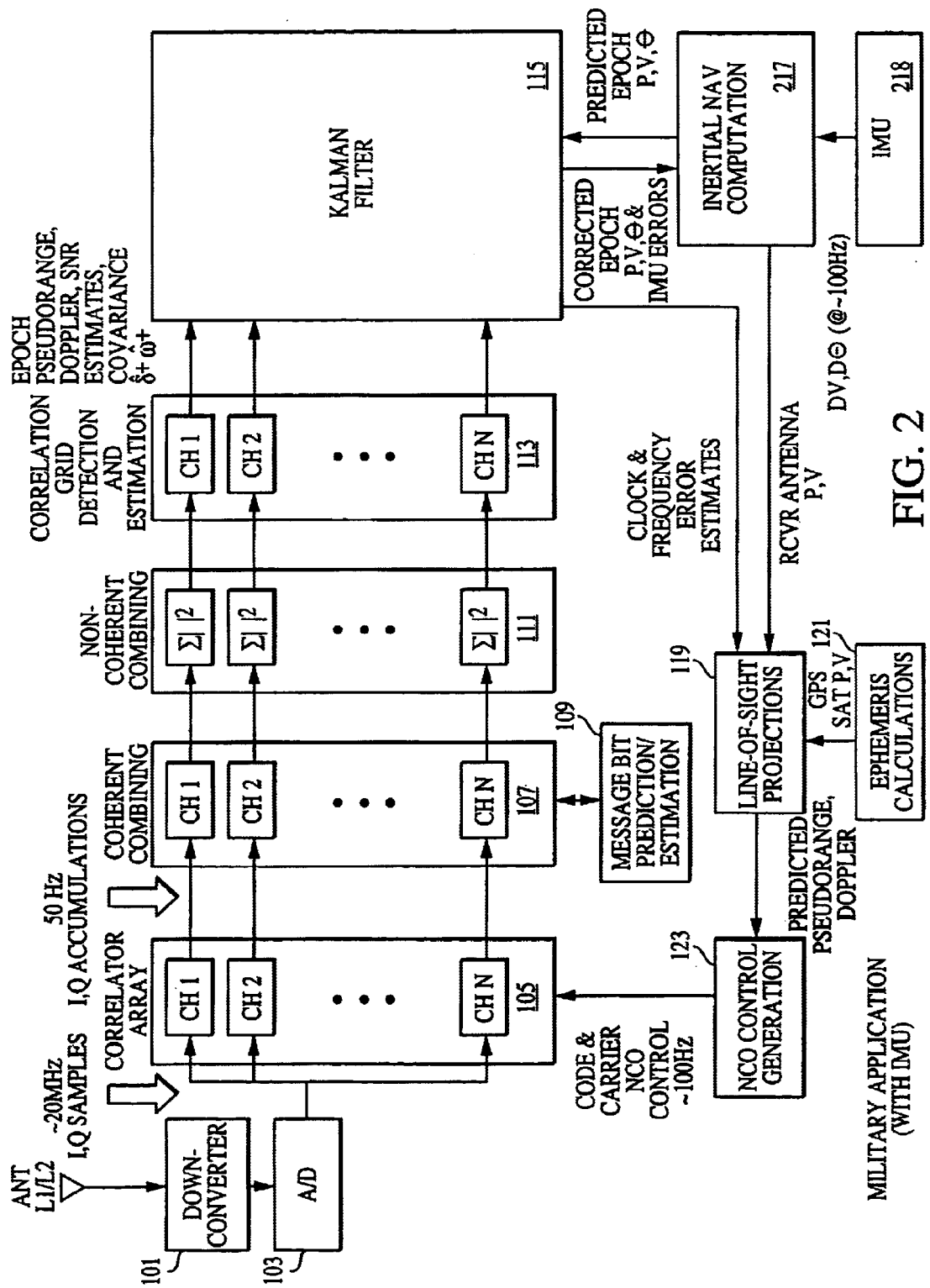

FIG. 2 is a diagram of a GPS receiver adapted for use with an inertial measurement unit according to an embodiment of the present invention. When the GPS receiver described above is used in with an IMU, the orbit propagator 117 is replaced with an inertial navigation computations module 217 IMU 218 as shown in FIG. 2. The inertial navigation computations module 217 receives high rate (i.e. >100 Hz) IMU data, updated P, V, and theta, and calibration coefficients for instrument errors, and computes at a high rate a navigation solution for position, velocity and orientation.

By utilizing the GPS receiver according to the present invention, it is possible to recover the pseudorange and Doppler information from the GPS signal when the signal is very weak or highly jammed. Also, although many of the modules of the present invention are described as realized in software processes, the modules can be implemented in hardware.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A system for increasing the signal recovery capability of a Global Positioning System (GPS) receiver having an antenna for receiving a plurality of GPS signals from a plurality of GPS satellites, a down converter for down-converting the plurality of received signals, and an analog-to-digital (A/D) converter for converting the plurality of down-converted signals to a plurality of digital signals, each signal being modulated by a carrier wave and coded by a unique code and having an I (in) and Q (quadrature) phase component, comprising:

a correlator array for correlating each of the plurality of digital signals by multiplying the I and Q phases by the carrier wave and unique code to extract the GPS signal, adding a location offset, accumulating the results of the correlation, and latching the results until a predetermined time;

a coherent combiner for coherent combining the accumulated results at the predetermined time;

a non-coherent combiner for non-coherent combining the coherent combined results for a time period sufficient to raise a correlation peak to a predetermined level above a noise floor to produce a plurality of non-coherent bin observables;

a correlation grid detector for determining a maximum value of the plurality of bin observables and comparing the maximum value to predetermined threshold, determining grid locations of bin observables having maximum values greater than the predetermined threshold, determining a bi-quadratic surface using the grid locations, and determining an argument maximum of the bi-quadratic surface;

a correlation grid estimator for estimating epoch pseudorange and Doppler variables based on the argument maximum; and a Kalman filter for estimating errors in at least one of position, velocity, user clock, frequency, and ionosphere states based on the estimated epoch pseudorange and Doppler variables.

2. The system of claim 1, wherein the correlator array comprises a plurality of accumulators for accumulating the results of the correlation.

3. The system of claim 1, wherein the correlator array comprises at least one code generator for triggering the start of an epoch.

4. The system of claim 1, wherein the Kalman filter comprises a fixed point smoother for predicting the estimated epoch pseudorange and Doppler variables.

5. The system of claim 1, wherein the Kalman filter estimates errors in orientation.

6. The system of claim 1, further comprising an orbit propagator for determining position and velocity by correcting for the estimated errors.

7. The system of claim 1, further comprising an inertial navigation computation module and an inertial measurement unit for determining position, velocity and orientation by correcting for the estimated errors.

8. A method for-increasing the accuracy of a Global Positioning System (GPS) receiver having an antenna for receiving a plurality of GPS signals from a plurality of GPS satellites, a down converter for down-converting the plurality of received signals, and an analog-to-digital (A/D) converter for converting the plurality of down-converted signals to a plurality of digital signals, each signal being modulated by a carrier wave and coded by a unique code and having an I (in) and Q (quadrature) phase component, comprising the steps of:

correlating each of the plurality of digital signals by multiplying the I and Q phases by the carrier wave and unique code to extract the GPS signal, adding a location offset, accumulating the results of the correlation, and latching the results until a predetermined time;

coherent combining the accumulated results at the predetermined time;

non-coherent combining the coherent combined results for a time period sufficient to raise a correlation peak to a predetermined point above a noise floor to produce a plurality of non-coherent bin observables;

determining a maximum value of the plurality of bin observables and comparing the maximum value to predetermined threshold;

determining grid locations of bin observables having maximum values greater than the predetermined threshold;

determining a bi-quadratic surface using the grid locations;

determining an argument maximum of the bi-quadratic surface;

estimating epoch pseudorange and Doppler variables based on the argument maximum;

estimating errors in at least one of position, velocity, user clock, frequency, and ionosphere states based on the estimated epoch pseudorange and Doppler variables; and determining at least one of position, and velocity by correcting for the estimated error.

9. The method of claim 8, further including the steps of:

estimating errors in orientation; and determining orientation by correcting for the estimated error.

* * * * *